(12) United States Patent
Byrd et al.

(10) Patent No.: US 7,661,135 B2
(45) Date of Patent: *Feb. 9, 2010

(54) APPARATUS, SYSTEM, AND METHOD FOR GATHERING TRACE DATA INDICATIVE OF RESOURCE ACTIVITY

(75) Inventors: Stephen A. Byrd, San Jose, CA (US); Steven Czerwinski, Berkeley, CA (US); J. Kristofer Fox, San Luis Obispo, CA (US); Bruce Light Hillsberg, San Carlos, CA (US); Bernhard Julius Klingenberg, Morgan Hill, CA (US); Rajesh Francisco Krishnan, San Jose, CA (US); Balaji Thirumalai, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 528 days.

This patent is subject to a terminal disclaimer.

(21) Appl. No.: 10/915,004

(22) Filed: Aug. 10, 2004

(65) Prior Publication Data

US 2006/0047805 A1    Mar. 2, 2006

(51) Int. Cl.
*G06F 12/14*   (2006.01)
*G06F 17/00*   (2006.01)

(52) U.S. Cl. .......................... 726/22; 726/11
(58) Field of Classification Search ............ 726/22, 726/1, 2, 6, 11, 12, 13, 26; 713/178, 154; 717/100, 105

See application file for complete search history.

(56) References Cited

U.S. PATENT DOCUMENTS 5,166,939 A    11/1992    Jaffe et al. ............... 371/40.1
5,367,671 A    11/1994    Feigenbaum ............... 395/600

(Continued)

FOREIGN PATENT DOCUMENTS

EP    1211596    6/2002

(Continued)

OTHER PUBLICATIONS

Representing Dynamic Performance Information in Grid Environments with the Network Weather Service Swany, M.; Wolski, R.; Cluster Computing and the Grid, 2002. 2nd IEEE/ACM International Symposium on May 21-24, 2002 pp. 48-48 Digital Object Identifier 10.1109/CCGRID.2002.1017111.*

(Continued)

*Primary Examiner*—Eleni A Shiferaw
(74) *Attorney, Agent, or Firm*—Kunzler & McKenzie

(57) ABSTRACT

An apparatus, system, and method are provided for gathering trace data indicative of resource activity on a computer system. The present invention includes a monitoring module that initiates one or more activity monitors on a target computer system to detect different types of resource activity. A determination module determines activity indicators involving resources of the target computer system using the one or more activity monitors. The activity indicators may comprise a variety of information useful in identifying one or more separate resource activities. A collection module organizes the activity indicators into trace data representative of the resource activity. Preferably, the monitoring module, determination module, and collection module operate continuously on the target computer system. In this manner, the trace data includes an accurate set of both current activity indicators as well as historical activity indicators.

15 Claims, 7 Drawing Sheets

U.S. PATENT DOCUMENTS

| | | | | |
|---|---|---|---|---|
| 5,432,937 | A | 7/1995 | Tevanian et al. | 395/700 |
| 5,457,797 | A | 10/1995 | Butterworth et al. | 395/650 |
| 5,600,778 | A | 2/1997 | Swanson | |
| 5,623,404 | A | 4/1997 | Collins et al. | |
| 5,689,700 | A | 11/1997 | Miller et al. | 395/610 |
| 5,764,911 | A | 6/1998 | Tezuka et al. | 395/200.53 |
| 5,794,224 | A | 8/1998 | Yufik et al. | |
| 5,826,239 | A | 10/1998 | Due et al. | |
| 5,845,293 | A | 12/1998 | Veghte et al. | 707/202 |
| 5,862,381 | A | 1/1999 | Advani | |
| 5,890,132 | A | 3/1999 | Sanders | 705/7 |
| 5,930,789 | A | 7/1999 | Agrawal et al. | 707/6 |
| 5,950,199 | A | 9/1999 | Schmuck et al. | 707/8 |
| 5,958,003 | A | 9/1999 | Preining et al. | |
| 6,076,105 | A | 6/2000 | Wolff et al. | 709/223 |
| 6,078,912 | A | 6/2000 | Buerger et al. | |
| 6,098,052 | A | 8/2000 | Kosiba et al. | |
| 6,098,074 | A | 8/2000 | Cannon et al. | 707/200 |
| 6,115,680 | A * | 9/2000 | Coffee et al. | 702/187 |
| 6,125,442 | A | 9/2000 | Maves et al. | 712/220 |
| 6,182,122 | B1 | 1/2001 | Berstis | 709/217 |
| 6,195,622 | B1 | 2/2001 | Altschuler et al. | |
| 6,256,648 | B1 | 7/2001 | Hill et al. | |
| 6,259,448 | B1 | 7/2001 | Mcnally et al. | |
| 6,275,977 | B1 | 8/2001 | Nagai et al. | 717/1 |
| 6,301,668 | B1 * | 10/2001 | Gleichauf et al. | 726/25 |
| 6,308,208 | B1 * | 10/2001 | Jung et al. | 709/224 |
| 6,351,847 | B1 | 2/2002 | Sakamoto et al. | 717/127 |
| 6,393,386 | B1 | 5/2002 | Zager et al. | |
| 6,484,177 | B1 | 11/2002 | Van Huben et al. | 707/10 |
| 6,526,442 | B1 | 2/2003 | Stupek, Jr. et al. | 709/224 |
| 6,601,035 | B1 | 7/2003 | Panagos et al. | |
| 6,615,225 | B1 | 9/2003 | Cannon et al. | 707/204 |
| 6,691,067 | B1 | 2/2004 | Ding et al. | |
| 6,704,874 | B1 * | 3/2004 | Porras et al. | 726/22 |
| 6,928,431 | B2 | 8/2005 | Dettinger et al. | |
| 7,051,098 | B2 * | 5/2006 | Masters et al. | 709/224 |
| 7,058,968 | B2 * | 6/2006 | Rowland et al. | 726/1 |
| 7,065,566 | B2 | 6/2006 | Menard et al. | |
| 7,065,624 | B1 | 6/2006 | Zahavi | |
| 7,120,934 | B2 * | 10/2006 | Ishikawa | 726/23 |
| 7,123,974 | B1 * | 10/2006 | Hamilton | 700/87 |
| 7,203,747 | B2 | 4/2007 | Bhat et al. | |
| 7,275,020 | B2 | 9/2007 | Sutton | |
| 7,406,475 | B2 | 7/2008 | Dome et al. | |
| 2002/0026433 | A1 * | 2/2002 | Kuiper | 706/45 |
| 2002/0069236 | A1 | 6/2002 | Jahnke | |
| 2002/0078382 | A1 * | 6/2002 | Sheikh et al. | 713/201 |
| 2002/0138559 | A1 | 9/2002 | Ulrich et al. | 709/203 |
| 2002/0147735 | A1 | 10/2002 | Nir | 707/200 |
| 2002/0174000 | A1 | 11/2002 | Katz et al. | |
| 2002/0178436 | A1 | 11/2002 | Mastrianni et al. | 717/110 |
| 2002/0188592 | A1 | 12/2002 | Leonhardt et al. | 707/1 |
| 2002/0188605 | A1 | 12/2002 | Adya et al. | 707/4 |
| 2002/0188733 | A1 | 12/2002 | Collins et al. | 709/229 |
| 2003/0023713 | A1 | 1/2003 | Slater et al. | 709/223 |
| 2003/0023949 | A1 | 1/2003 | Hagmeier et al. | 717/101 |
| 2003/0061129 | A1 | 3/2003 | Todd et al. | 705/29 |
| 2003/0110263 | A1 | 6/2003 | Shillo | 709/226 |
| 2003/0110513 | A1 | 6/2003 | Plourde, Jr. et al. | 725/134 |
| 2003/0126265 | A1 | 7/2003 | Aziz et al. | 709/227 |
| 2003/0149756 | A1 | 8/2003 | Grieve et al. | 709/223 |
| 2003/0149761 | A1 | 8/2003 | Baldwin et al. | 709/224 |
| 2003/0149770 | A1 | 8/2003 | Delaire et al. | 709/226 |
| 2003/0154238 | A1 | 8/2003 | Murphy et al. | 709/201 |
| 2003/0187860 | A1 | 10/2003 | Holland | 707/100 |
| 2003/0191911 | A1 | 10/2003 | Kleinschnitz, Jr. et al. | 711/154 |
| 2003/0204562 | A1 | 10/2003 | Hwang | 709/203 |
| 2004/0025162 | A1 | 2/2004 | Fisk | |
| 2004/0034543 | A1 | 2/2004 | Bartsch | |
| 2004/0054850 | A1 | 3/2004 | Fisk | |
| 2004/0088375 | A1 | 5/2004 | Sethi et al. | |
| 2004/0098229 | A1 | 5/2004 | Error et al. | |
| 2004/0103186 | A1 * | 5/2004 | Casati et al. | 709/224 |
| 2004/0107414 | A1 | 6/2004 | Bronicki | |
| 2004/0111309 | A1 | 6/2004 | Matheson et al. | |
| 2004/0215621 | A1 | 10/2004 | Harvey et al. | |
| 2005/0076138 | A1 | 4/2005 | Sterne | |
| 2005/0096877 | A1 | 5/2005 | Shimazaki et al. | |
| 2005/0119905 | A1 | 6/2005 | Wong et al. | |
| 2005/0144051 | A1 | 6/2005 | Wilson | |
| 2005/0144072 | A1 | 6/2005 | Perkowski | |
| 2005/0210262 | A1 | 9/2005 | Rolia et al. | |
| 2005/0216282 | A1 | 9/2005 | Chen et al. | |
| 2005/0257085 | A1 * | 11/2005 | Haustein et al. | 714/13 |
| 2006/0282534 | A1 | 12/2006 | Berg | |
| 2007/0107052 | A1 * | 5/2007 | Cangini et al. | 726/22 |
| 2008/0021874 | A1 | 1/2008 | Dahl et al. | |
| 2008/0028409 | A1 | 1/2008 | Cherkasova et al. | |

FOREIGN PATENT DOCUMENTS

| | | |
|---|---|---|
| JP | 2001014188 | 6/1999 |
| WO | WO 01/27762 A1 | 4/2001 |
| WO | WO 01/47182 A2 | 6/2001 |
| WO | WO 03/005165 | 1/2003 |

OTHER PUBLICATIONS

Operating System Concepts, 6th Edition/Windows XP Update Abraham Silberschatz, Yale University, Greg Gagne, Westminster College Peter Baer Galvin, Corporate Technologies, ISBN: 978-0-471-25060-9 © 2003.*

Experiences in designing a modular resource monitoring system Ciuffoletti, A.; Enabling Technologies: Infrastructure for Collaborative Enterprises, 2004. Wet Ice 2004. 13th IEEE International Workshops on, Jun. 14-16, 2004 pp. 260-265 Digital Object Identifier 10.1109/ENABL.2004.29.*

Semantics and knowledge grids: building the next-generation grid Cannataro, M.; Talia, D.; Intelligent Systems, IEEE [see also IEEE Intelligent Systems and Their Applications] vol. 19, Issue 1, Jan.-Feb. 2004 pp. 56-63 Digital Object Identifier 10.1109/MIS.2004.1265886.*

HP OpenView for Windows® User's Guide For Transcend Management Software Version 6.1 for Windows® and '97 for Windows NT Oct. 1997, pp. 14-21.*

"Filter Drivers", Kernel-Mode Driver Architecture: Windows DDK; http://msdn.microsoft.com/library/en-us/kmarch/hh/kmarch/wdmintro_7dpj.asp?frame=true.

"Types of WDM Drivers", Kernel-Mode Driver Architecture: Windows DDK; http://msdn.microsoft.com/library/en-us/kmarch/hh/kmarch/wdmintro_3ep3.asp?frame=true.

"Event Tracker For Windows-Details", http://www.eventlogmanager.com/details.htm.

"Event Tracker For Windows-Feature List", http://www.eventlogmanager.com/feature-list.htm.

Ed Frauenheim, "HP unveils data management effort",Sep. 16, 2003, http://news.com.com/2102-1011_3-5077651.html.

"Automated Resource Management", Technology Brief Aug. 2002, The Enterprise Storage Group, pp. 1-3.

"Novator Open File Manager", http://www.hallogram.com/novastoropen.

Johan Moe et al., "Using execution trace data to improve distribute systems", The ACM Digital Library, http://portal.acm.org/.

Jeong, Il-Jun, "On-board Task Scheduling Algorithm for Spacecraft," Proceedings of the 2000 IEEE International Conference on Robotics & Automation, San Francisco CA, Apr. 2000.

Raut, Ashutosh, "Enterprise Business Process Integration," IEEE, c 2003.

* cited by examiner

APPARATUS, SYSTEM, AND METHOD FOR GATHERING TRACE DATA INDICATIVE OF RESOURCE ACTIVITY

BACKGROUND OF THE INVENTION

1. Field of the Invention

The invention relates to computer systems. Specifically, the invention relates to apparatus, systems, and methods for gathering trace data indicative of resource activity on a computer system.

2. Description of the Related Art

Computer and information technology continues to progress and grow in its capabilities and complexity. In particular, software applications have evolved from single monolithic programs to many hundreds or thousands of object-oriented components that can execute on a single machine or distributed across many computer systems on a network.

Computer software and its associated data is generally stored in persistent storage organized according to some format such as a file. Generally, the file is stored in persistent storage such as a Direct Access Storage Device (DASD, i.e., a number of hard drives). Even large database management systems employ some form of files to store the data and potentially the object code for executing the database management system.

Business owners, executives, managers, administrators, and the like concentrate on providing products and/or services in a cost-effective and efficient manner. These business executives recognize the efficiency and advantages software applications can provide. Consequently, business people factor in the business software applications in long range planning and policy making to ensure that the business remains competitive in the market place.

Instead of concerning themselves with details such as the architecture and files defining a software application, business people are concerned with business processes. Business processes are internal and external services provided by the business. More and more of these business processes are provided at least in part by one or more software applications. One example of a business process is internal communication among employees. Often this business process is implemented largely by an email software application. The email software application may include a plurality of separate executable software components such as clients, a server, a Database Management System (DBMS), and the like.

Generally, business people manage and lead most effectively when they focus on business processes instead of working with confusing and complicated details about how a business process is implemented. Unfortunately, the relationship between a business process policy and its implementation is often undefined, particularly in large corporations. Consequently, the affects of the business policy must be researched and explained so that the burden imposed by the business process policy can be accurately compared against the expected benefit. This may mean that computer systems, files, and services affected by the business policy must be identified.

FIG. 1 illustrates a conventional system 100 for implementing a business process. The business process may be any business process. Examples of business processes that rely heavily on software applications include an automated telephone and/or Internet retail sales system (web storefront), an email system, an inventory control system, an assembly line control system, and the like.

Generally, a business process is simple and clearly defined. Often, however, the business process is implemented using a variety of cooperating software applications comprising various executable files, data files, clients, servers, agents, daemons/services, and the like from a variety of vendors. These software applications are generally distributed across multiple computer platforms.

In the example system 100, an E-commerce website is illustrated with components executing on a client 102, a web server 104, an application server 106, and a DBMS 108. To meet system 100 requirements, developers write a servlet 110 and applet 112 provided by the web server 104, one or more business objects 114 on the application server 106, and one or more database tables 116 in the DBMS 108. These separate software components interact to provide the E-commerce website.

As mentioned above, each software component originates from, or uses, one or more files 118 that store executable object code. Similarly, data files 120 store data used by the software components. The data files 120 may store configuration settings, user data, system data, database rows and columns, or the like.

Together, these files 118, 120 constitute resources required to implement the business process. In addition, resources may include Graphical User Interface (GUI) icons and graphics, static web pages, web services, web servers, general servers, and other resources accessible on other computer systems (networked or independent) using Uniform Resource Locators (URLs) or other addressing methods. Collectively, all of these various resources are required in order to implement all aspects of the business process. As used herein, "resource(s)" refers to all files containing object code or data as well as software modules used by the one or more software applications and components to perform the functions of the business process.

Generally, each of the files 118, 120 is stored on a storage device 122a-c identified by either a physical or virtual device or volume. The files 118, 120 are managed by separate file systems (FS) 124a-c corresponding to each of the platforms 104, 106, 108.

Suppose a business manager wants to implement a business level policy 126 regarding the E-commerce website. The policy 126 may simply state: "Backup the E-commerce site once a week." Of course, other business level policies may also be implemented with regard to the E-commerce website. For example, a load balancing policy, a software migration policy, a software upgrade policy, and other similar business policies can be defined for the business process at the business process level.

Such business level policies are clear and concise. However, implementing the policies can be very labor intensive, error prone, and difficult. Generally, there are two approaches for implementing the backup policy 126. The first is to backup all the data on each device or volume 122a-c. However, such an approach backs up files unrelated to the particular business process when the device 122a-c is shared among a plurality of business processes. Certain other business policies may require more frequent backups for other files on the volume 122a-c related to other business processes. Consequently, the policies conflict and may result in wasted backup storage space and/or duplicate backup data. In addition, the time required to perform a full copy of the devices 122a-c may interfere with other business processes and unnecessarily prolong the process.

The second approach is to identify which files on the devices 122a-c are used by, affiliated with, or otherwise comprise the business process. Unfortunately, there is not an automatic process for determining what all the resources are that are used by the business process, especially business processes that are distributed across multiple systems. Certain logical rules can be defined to assist in this manual process. But, these rules are often rigid and limited in their ability to accurately identify all the resources. For example, such rules will likely miss references to a file on a remote server by a URL during execution of an infrequent feature of the business process. Alternatively, devices 122a-c may be dedicated to software and data files for a particular process. This approach, however, may result in wasted unused space on the devices 122a-c and may be unworkable in a distributed system.

Generally, a computer system administrator must interpret the business level policy 126 and determine which files 118, 120 must be included to implement the policy 126. The administrator may browse the various file systems 124a-c, consult user manuals, search registry databases, and rely on his/her own experience and knowledge to generate a list of the appropriate files 118, 120.

In FIG. 1, one implementation 128 illustrates the results of this manual, labor-intensive, and tedious process. Such a process is very costly due to the time required not only to create the list originally, but also to continually maintain the list as various software components of the business process are upgraded and modified. In addition, the manual process is susceptible to human error. The administrator may unintentionally omit certain files 118, 120.

The implementation 128 includes both object code files 118 (i.e., e-commerce.exe. Also referred to as executables) and data files 120 (i.e., e-comdata1.db). However, due to the manual nature of the process and storage space concerns, efforts may be concentrated on the data files 120 and data specific resources. The data files 120 may be further limited to strictly critical data files 120 such as database files. Consequently, other important files, such as executables and user configuration and system-specific setting files, may not be included in the implementation 128. Alternatively, user data, such as word processing documents, may also be missed because the data is stored in an unknown or unpredictable location on the devices 122a-c.

Other solutions for grouping resources used by a business process have limitations. One solution is for each software application that is installed to report to a central repository which resources the application uses. However, this places the burden of tracking and listing the resources on the developers who write and maintain the software applications. Again, the developers may accidentally exclude certain files. In addition, such reporting is generally done only during the installation. Consequently, data files created after that time may be stored in unpredictable locations on a device 122a-c.

Information regarding activities and computing operations performed by resources of a computer processing system is useful for identifying a business process as well as other purposes. For example, it is desirable to determine comprehensively what short term and long term (historical) activities have been conducted on a target computer system. In addition, it is desirable to know which resources conducted certain types of resource activities. Unfortunately, conventional systems and methods fail to provide these benefits.

From the foregoing discussion, it should be apparent that a need exists for an apparatus, system, and method that gathers trace data indicative of resource activity. Beneficially, such an apparatus, system, and method would gather the trace data automatically and make the trace data accessible to other software processes by way of an Application Programming Interface and/or use of a standard data exchange format for the trace data. Furthermore, the apparatus, system, and method would allow for modular gathering of trace data such that different types of trace data may be gathered without significantly altering the apparatus, system, and/or method.

SUMMARY OF THE INVENTION

The present invention has been developed in response to the present state of the art, and in particular, in response to the problems and needs in the art that have not yet been met for gathering trace data indicative of resource activity. Accordingly, the present invention has been developed to provide an apparatus, system, and method for gathering trace data indicative of resource activity that overcomes many or all of the above-discussed shortcomings in the art.

An apparatus according to the present invention includes a monitoring module, a determination module, and a collection module. The monitoring module initiates one or more activity monitors on a target computer system. Each activity monitor may be configured to detect a specific type of resource activity. Alternatively, a single activity monitor may detect a plurality of resource activity types. Preferably, each activity monitor detects resource activities of all resources associated with the target computer system.

The determination module determines activity indicators involving resources of the target computer system using the one or more activity monitors. Preferably, the determination module is closely coupled with the target computer system such that substantially all resource activities can be monitored if a particular activity monitor requires low-level access to resource activities conducted on the target computer system. For example, certain activity monitors may monitor all I/O communication regarding a class of peripheral devices of the target computer system such as disk drives. Preferably, the determination module determines substantially all the activity indicators that are available from the hardware and software components of the target computer system.

The activity indicators may comprise a variety of information useful in identifying one or more separate resource activities. A non-exhaustive list of activity indicators may include remote procedure calls, file I/O operations, process spawning operations, peripheral I/O operations, network I/O operations, and the like. In addition to events indicative of resource activity, activity indicators also include data generated before, during, or after a resource activity and data made available by conventional modules of the target computer system that indicates specific types of resource activities being conducted on the target computer system.

The collection module organizes the activity indicators into trace data representative of the resource activity. The trace data may include metadata regarding when the trace data is collected and organized. Preferably, the monitoring module, determination module, and collection module operate continuously on the target computer system. In this manner, the trace data include an accurate set of both current activity indicators as well as historical activity indicators. As used herein, "historical activity indicators" refers to activity indicators collected over an extended period of time such as, but not limited to, days or weeks. The extended period of time may or may not be a continuous time period. Historical activity indicators may also be referred to herein as long term.

In one embodiment, the trace data is organized into a standard data exchange format. A storage module may store the trace data in a central repository. The apparatus may include an Application Programming Interface (API) that provides a set of con trace data in response to a request from a third party computer process. The apparatus may also include a launch module that initiates selected activity monitors according to a user-defined time criteria (i.e., a schedule) or other activity monitors in response to occurrence of a predefined event on the target computer system.

A method of the present invention is also presented for gathering trace data indicative of resource activity on a computer system. In one embodiment, the method includes initiating one or more activity monitors on a target computer system. Preferably, the activity monitors are modular and operate independent of each other. Next, activity indicators involving resources of the target computer system are determined using one or more of the activity monitors. Finally, activity indicators are organized into trace data representative of various types of resource activity. Certain trace data can include both current activity indicators and historical activity indicators.

The present invention also includes other embodiments arranged as a system, machine-readable instructions, and an apparatus that comprise substantially the same functionality as the components and steps described above in relation to the apparatus and method. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
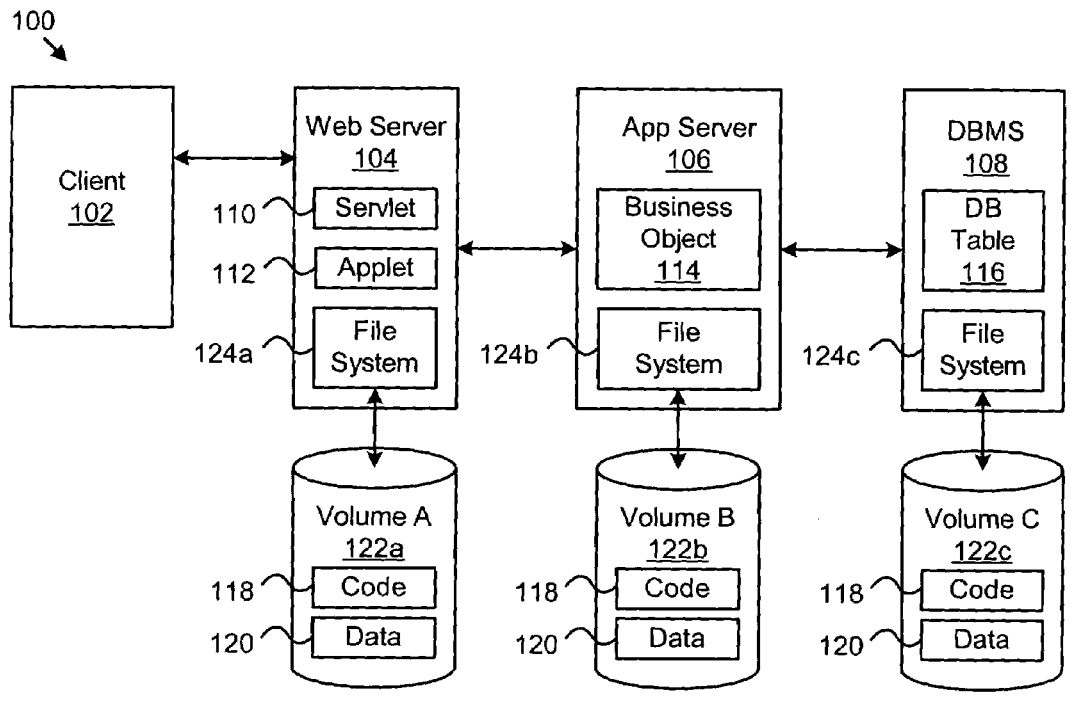
FIG. 1 is a block diagram illustrating one example of how a business level policy may be conventionally implemented.
Figure 1:
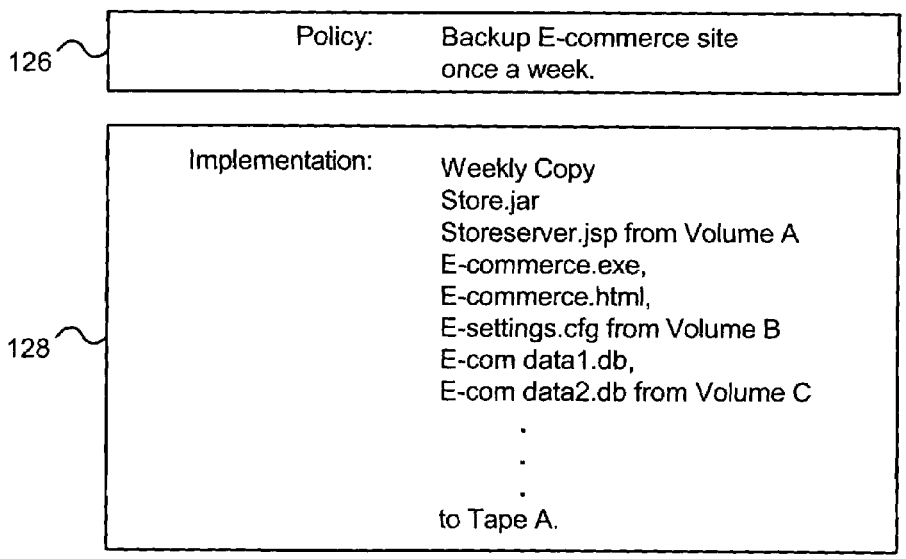

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
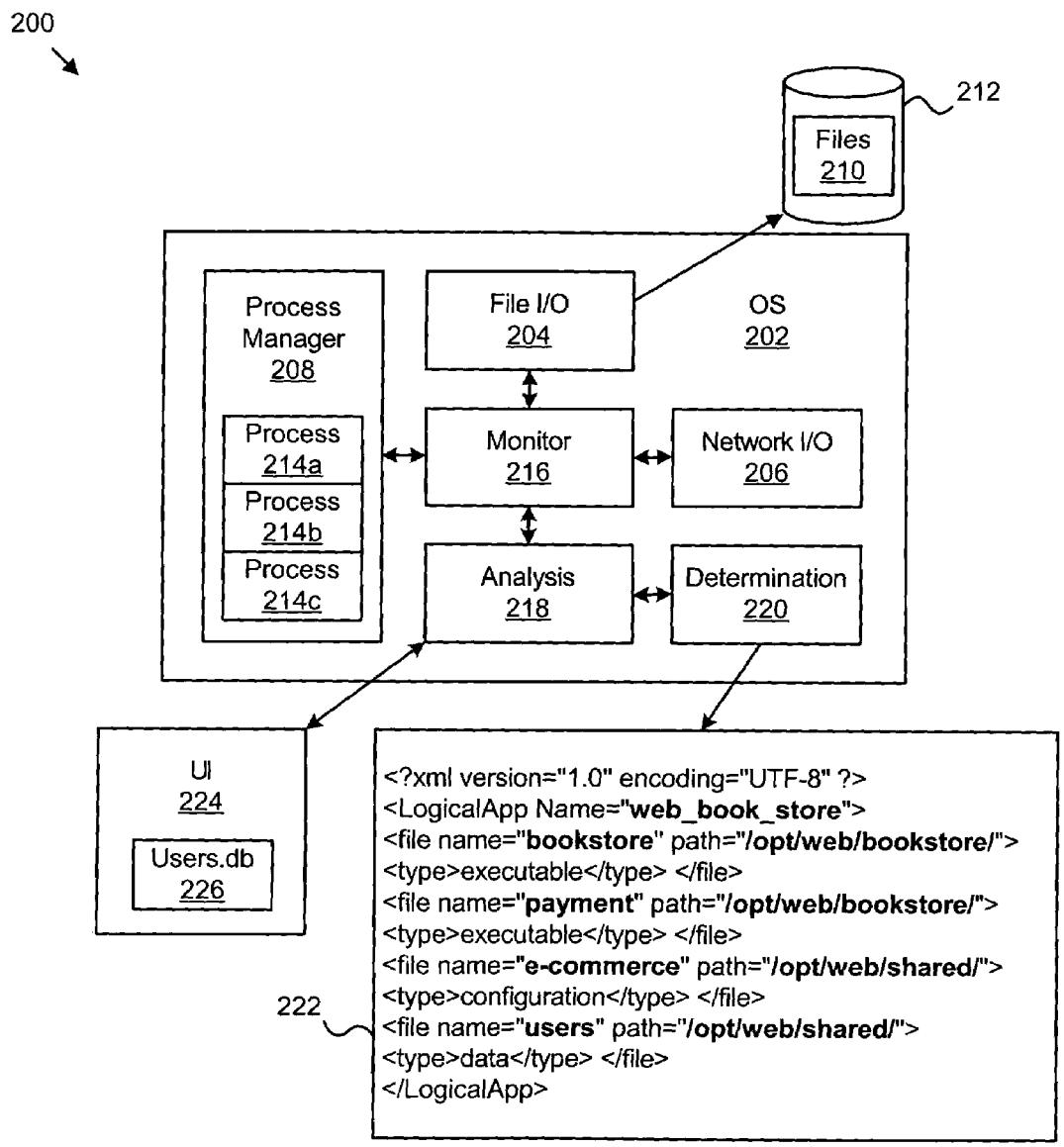
FIG. 2 is a logical block diagram illustrating one embodiment of an apparatus that automatically discovers and groups resources used by a logical application.

FIG. 2 illustrates a logical block diagram of an apparatus 200 configured to automatically discover and group files used by a logical application which may also correspond to a business process. A business process may be executed by a wide array of hardware and software components configured to cooperate to provide the desired business services (i.e., email services, retail web storefront, inventory management, etc.). For clarity, certain well-known hardware and software components are omitted from FIG. 2.

The apparatus 200 may include an operating system 202 that provides general computing services through a file I/O module 204, network I/O module 206, and process manager 208. The file I/O module 204 manages low-level reading and writing of data to and from files 210 stored on a storage device 212, such as a hard drive. Of course, the storage device 212 may also comprise a storage subsystem such as various types of DASD systems. The network module 206 manages network communications between processes 214 executing on the apparatus 200 and external computer systems accessible via a network (not shown). Preferably, the file I/O module 204 and network module 206 are modules provided by the operating system 202 for use by all processes 214a-c. Alternatively, custom file I/O module 204 and network modules 206 may be written where an operating system 202 does not provide these modules.

The operating system 202 includes a process manager 208 that schedules use of one or more processors (not shown) by the processes 214a-c. The process manager 208 includes certain information about the executing processes 214a-c. In one embodiment, the information includes a process ID, a process name, a process owner (the user that initiated the process), process relation (how a process relates to other executing processes, i.e., child, parent, sibling), other resources in use (open files or network ports), and the like.

Typically, the business process is defined by one or more currently executing processes 214a-c. Each process 214 includes either an executable file 210 or a parent process which initially creates the process 214. Information provided by the process manager 208 enables identification of the original files 210 for the executing processes 214a-c, discussed in more detail below.

In certain embodiments, the apparatus 200 includes a monitoring module 216, analysis module 218, and determination module 220. These modules 216, 218, 220 cooperate to dynamically identify the resources that comprise a logical application that corresponds to the business process. Typically, these resources are files 210. Alternatively, the resources may be other software resources (servers, daemons, etc.) identifiable by a network address such as a URL or IP address.

In this manner, operations can be performed on the files 210 and other resources of a logical application (business process) without the tedious, labor intensive, error prone process of manually identifying these resources. These operations include implementing business level policies such as policies for backup, recovery, server load management, migration, and the like.

The monitoring module 216 communicates with the process manager 208, file I/O module 204, and network I/O module 206 to collect trace data. The trace data is any data indicative of operational behavior of a software application (as used herein "application" refers to a single process and "logical application" refers to a collection of one or more processes that together implement a business process). Trace data may be identifiable both during execution of a software application or after initial execution of a software application. Certain trace data may also be identifiable after the initial installation of a software application. For example, software applications referred to as installation programs can create trace data simply by creating new files in a specific directory.

Preferably, the monitoring module 216 collects trace data for all processes 214a-c. In one embodiment, the monitoring module 216 collects trace data based on an identifier (discussed in more detail below) known to directly relate to a resource implementing the business process. Alternatively, the monitoring module 216 may collect trace data for all the resources of an apparatus 200 without distinguishing based on an identifier.

In one embodiment, the monitoring module 216 communicates with the process manager 208 to collect trace data relating to processes 214 currently executing. The trace data collected represents processes 214a-c executing at a specific point in time. Because the set of executing processes 214a-c can change relatively frequently, the monitoring module 216 may periodically collect trace data from the process manager 208. Preferably, a user-configurable setting determines when the monitoring module 216 collects trace data from the process manager 208.

The monitoring module 216 also communicates with the file I/O module 204 and network module 206 to collect trace data. The file I/O module 204 maintains information about file access operations including reads, writes, and updates. From the file I/O module, the monitoring module 216 collects trace data relating to current execution of processes 214 as well as historical operation of processes 214.

Trace data collected from the file I/O module 204 may include information such as file name, file directory structure, file size, file owner/creator, file access rights, file creation date, file modification date, file type, file access timestamp, what type of file operation was performed (read, write, update), and the like. In one embodiment, the monitoring module 216 may also determine which files 210 are currently open by executing processes 214. In certain embodiments, the monitoring module 216 collects trace data from a file I/O module 204 for one or more file systems across a plurality of storage devices 212.

As mentioned above, the monitoring module 216 may collect trace data for all files 210 of a file system or only files and directories clearly related to an identifier. The identifier and/or resources presently included in a logical application may be used to determine which trace data is collected from a file system.

The monitoring module 216 collects trace data from the network I/O module 206 relating to network activity by the processes 214a-c. Certain network activity may be clearly related to specific processes 214 and/or files 210. Preferably, the network I/O module 206 provides trace data that associates one or more processes 214 with specific network activity. A process 214 conducting network activity is identified, and the resource that initiated the process 214 is thereby also identified.

Trace data from the network I/O module 206 may indicate which process 214 has opened specific ports for conducting network communications. The monitoring module 216 may collect trace data for well-known ports which are used by processes 214 to perform standard network communications. The trace data may identify the port number and the process 214 that opened the port. Often only a single, unique process uses a particular network port.

For example, communications over port eighty may be used to identify a web server on the apparatus 200. From the trace data, the web server process and executable file may be identified. Other well-known ports include twenty for FTP data, twenty-one for FTP control messages, twenty-three for telnet, fifty-three for a Domain Name Server, one hundred and ten for POP3 email, etc.

In certain operating systems 202, such as UNIX and LINUX, network I/O trace data is stored in a separate directory. In other operating systems 202 the trace data is collected using services or daemons executing in the background managing the network ports.

In one embodiment, the monitoring module 216 autonomously communicates with the process manager 208, file I/O module 204, and network I/O module 206 to collect trace data. As mentioned, the monitoring module 216 may collect different types of trace data according to different user-configurable periodic cycles. When not collecting trace data, the monitoring module 216 may "sleep" as an executing process until the time comes to resume trace data collection. Alternatively, the monitoring module 216 may execute in response to a user command or command from another process.

The monitoring module 216 collects and preferably formats the trace data into a common format. In one embodiment, the format is in one or more XML files. The trace data may be stored on the storage device 212 or sent to a central repository such as a database for subsequent review.

The analysis module 218 analyzes the trace data to discover resources that are affiliated with a business process. Because the trace data is collected according to operations of software components implementing the business process, the trace data directly or indirectly identifies resources required to perform the services of the business process. By identifying the resources that comprise a business process, business management policies can be implemented for the business process as a whole. In this way, business policies are much simpler to implement and more cost effective.

In one embodiment, the analysis module 218 applies a plurality of heuristic routines to determine which resources are most likely associated with a particular logical application and the business process represented by the logical application. The heuristic routines are discussed in more detail below. Certain heuristic routines establish an association between a resource and the logical application with more certainty than others. In one embodiment, a user may adjust the confidence level used to determine whether a candidate resource is included within the logical application. This confidence level may be adjusted for each heuristic routine individually and/or for the analysis module 218 as a whole.

The analysis module 218 provides the discovered resources to a determination module 220 which defines a logical application comprising the discovered resources. Preferably, the determination module 220 defines a structure 222 such as a list, table, software object, database, a text eXtended Markup Language (XML) file, or the like for recording associations between discovered resources and a particular logical application. As mentioned above, a logical application is a collection of resources required to implement all aspects of a particular business process.

The structure 222 includes a name for the logical application and a listing of all the discovered resources. Preferably, sufficient attributes about each discovered resource are included such that business policies can be implemented with the resources. Attributes such as the name, location, and type of resource are provided.

In addition, the structure 222 may include a frequency rating indicative of how often the resource is employed by the business process. In certain business processes this frequency rating may be indicative of the importance of the resource. In addition, a confidence value determined by the analysis module 218 may be stored for each resource.

The confidence level may indicate how likely the analysis module 218 has determined that this resource is properly associated with the given logical application. In one embodiment, this confidence level is represented by a probability percentage. For certain resources, the structure 222 may include information such as a URL or server name that includes resources used by the business process but not directly accessible to the analysis module 218.

Preferably, the analysis module 218 cooperates with the determination module 220 to define a logical application based on an identifier for the business process. In this manner, the analysis module 218 can use the identifier to filter the trace data to a set more likely to include resources directly related to a business process of interest. Alternatively, the analysis module 218 may employ certain routines or algorithms to propose certain logical applications based on clear evidence of relatedness from the trace data as a whole without a predefined identifier.

A user interface (UI) 224 may be provided so that a user can provide the identifier to the analysis module 218. The identifier 226 may comprise one of several types of identifiers including a file name for an executable or data file, file name or process ID for an executing process, a port number, a directory, and the like. The resource identified by the identifier 226 may be considered a seed resource for the logical application, as the resource identified by the identifier 226 is included in the logical application by default and is used to add additional resources discovered by searching the trace data.

For example, a user may desire to create a logical application according to which processes accessed the data base file "Users.db." In the UI 224, the user enters the file name users.db. The analysis module 218 then searches the trace data for processes that opened or closed the users.db file. Heuristic routines are applied to any candidate resources identified, and the result set of resources is presented to the user in the UI 224.

The result set includes the same information as in the structure 222. The UI 224 may also allow the user to modify the contents of the logical application by adding or removing certain resources. The user may then store a revised logical application in a human readable XML structure 222. In addition, the user may adjust confidence levels for the heuristic routines and the analysis module 218 overall.

In this manner, the apparatus 200 allows for creation of logical applications which correspond to business processes. The logical applications track information about resources that implement the business process to a sufficient level of detail that business level policies, such as backup, recovery, migration, and the like, may be easily implemented. Furthermore, logical application definitions can be readily adjusted and adapted as subsystems implementing a business process are upgraded, replaced, and modified. The logical application tracks business data as well as the processes/executables that operate on that business data. In this manner, business data is fully archivable for later use without costly conversion and data extraction procedures.

Figure 3:
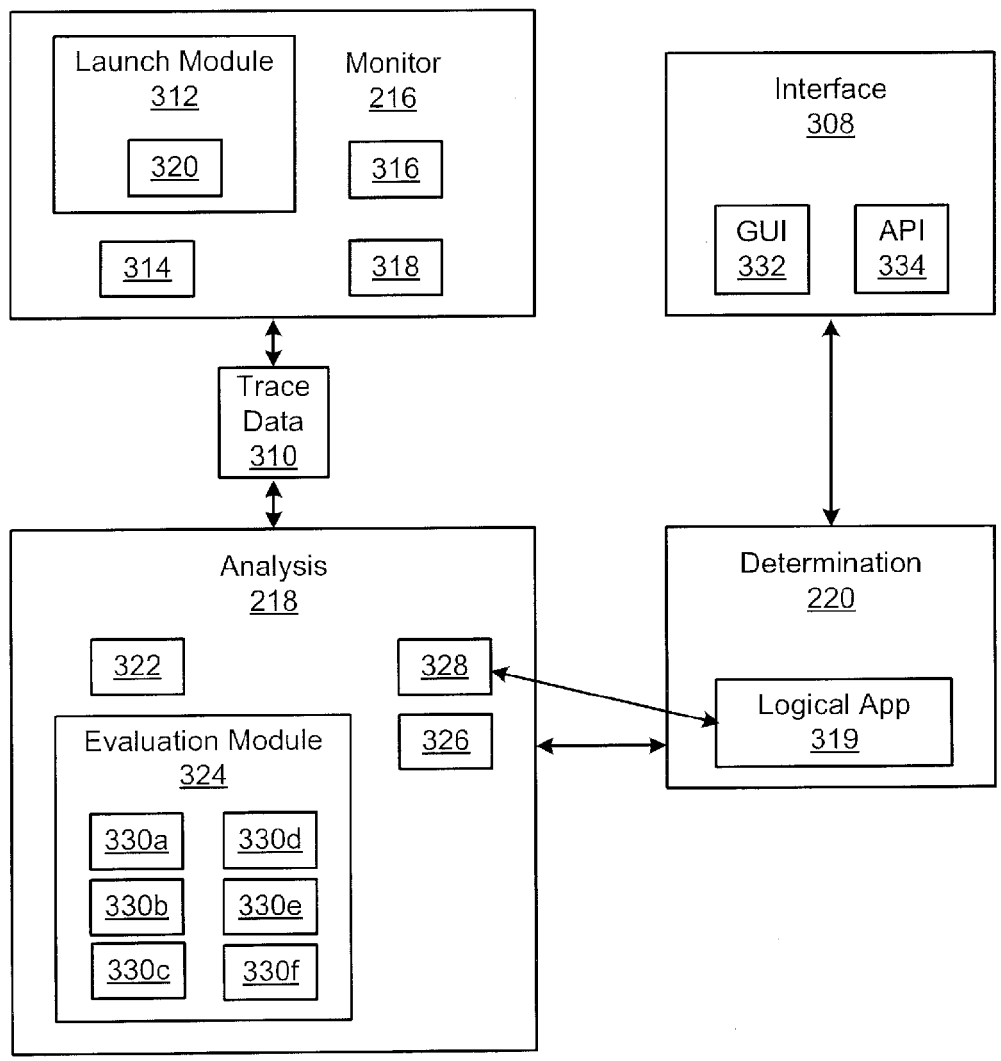
FIG. 3 is a schematic block diagram illustrating in detail sub-components of the apparatus of FIG. 2.

FIG. 3 illustrates more details of one embodiment of the present invention. This embodiment is similar to the apparatus 200 illustrated in FIG. 2. Specifically, the illustrated embodiment includes a monitoring module 216, analysis module 218, determination module 220, and interface 308.

In one embodiment, the monitoring module 216 collects trace data 310 as a business process is executing. In other words, the monitoring module 216 collects trace data as applications implementing the business process are executing. However, the monitoring module 216 may also collect sufficient trace data 310 when a business process is not being executed/operated. In addition, the interface 308 may receive an identifier that directly relates a resource implementing a business process to the business process. Preferably, the identifier is unique to the business process, although uniqueness may not always be required. This identifier may be used by the analysis module 218 in analyzing the trace data 310.

The monitoring module 216 includes a launch module 312, a controller 314, a storage module 316, and a scanner 318. The launch module 312 initiates one or more activity monitors 320. The launch module 312 may launch activity monitors 320 when the monitoring module 216 starts, or periodically according to monitoring schedules defined for each activity monitor 320 or for the monitoring module 216 as a whole.

An activity monitor 320 is a software function, thread, process, driver, or application configured, in one embodiment, to trace a specific type of activity relating to a resource. The activity monitor may gather the trace data by monitoring the activity directly or indirectly by gathering trace data from other modules such as the process manager 208, file I/O module 204, and network I/O module 206 described in relation to FIG. 2.

In one embodiment, each activity monitor 320 collects trace data for a specific type of activity. For example, a file I/O activity monitor 320 may communicate with a file I/O module 204 and capture all file I/O operations as well as contextual information, such as which process made the file I/O request, what type of request was made and when. One example of an activity monitor 320 that may be used with the present invention is a file filter module described in U.S. patent application Ser. No. 10/681,557, filed on Oct. 7, 2003, entitled "Method, System, and Program for Processing a File Request," hereby incorporated by reference. Of course, various other types of activity monitors may be initiated depending on the nature of the activities performed by the business process. Certain activity monitors may trace Remote Procedure Calls (RPC).

The controller 314 controls the operation of the activity monitors 320 in one embodiment. The controller 314 may adjust the priorities for scheduling of the activity monitors 320 for use of a monitored system's processor(s). In this manner, the controller 314 allows monitoring to continue and the impact of monitoring to be dynamically adjusted as needed. The control and affect of the controller 314 on overall system performance is preferably user configurable.

The storage module 316 interacts with the activity monitors 320 to collect and store the trace data collected by each individual activity monitor 320. In certain embodiments, when an activity monitor 320 detects a resource (executable file, data file, or software module) conducting a specific type of activity, the activity monitor 320 provides the activity specific trace data to the storage module 316 for storage.

The storage module 316 may perform certain general formatting and organization to the trace data before storing the trace data. Preferably, trace data for all the activity monitors 320 is stored in a central repository. The central repository may be implemented using well known data structures including ASCII text file(s), extensible Markup Language (XML) files, databases, and the like.

Typically, activity monitors 320 monitor dynamic activities performed during operation of a business process while the scanner 318 collects trace data from relatively static system information such as file system information, processes information, networking information, I/O information, and the like. The scanner 318 scans the system information for a specific type of activity performed by the business process or any process on the computer system.

For example, the scanner 318 may scan one or more file system directories for files created/owned by a particular resource. The name resource may correspond to the identifier such that it is clear that the resource belongs to the logical application 319 that implements the business process. Consequently, the scanner 318 may provide any trace data found to the storage module 316 for storage.

In one embodiment, the monitoring module 216 produces a set or batch of trace data 310 that the analysis module 218 examines at a later time (batch mode). Alternatively, the monitoring module 216 may provide a stream of trace data 310 to the analysis module 218 which analyzes the trace data 310 as the trace data 310 is provided (streaming mode). Both modes are considered within the scope of the present invention.

The analysis module 218 may include a query module 322, an evaluation module 324, a discovery module 326, and a modification module 328. The evaluation module 324 and discovery module 326 work closely together to identify candidate resources to be associated with a logical application 319.

The evaluation module 324 applies one or more heuristic routines 330a-f to a set of trace data 310. Preferably, the query module 322 filters the trace data 310 to a smaller result set. Alternatively, the heuristic routines 330a-f are applied to all available trace data 310.

The filter may comprise an identifier directly associated with a business process. The identifier may be a resource name such as a file name. Alternatively, the filter may be based on time, activity, type, or other suitable criteria to reduce the size of the trace data 310. The filter may be generic or based on specific requirements of a particular heuristic routine 330a-f.

In one embodiment, the evaluation module 324 applies the heuristic routines 330a-f based on an identifier. The identifier provides a starting point for conducting the analysis of trace data. In one embodiment, an identifier known to be associated with the business process is automatically associated with the corresponding logical application 319. The identifier is a seed for determining which other resources are also associated with the logical application 319. The identifier may be a file name for a key executable file known to be involved in a particular business process.

Each heuristic routine 330a-f analyzes the trace data based on the identifier or a characteristic of a software application represented by the identifier. For example, the characteristic may comprise the fact that this software application always conducts network I/O over port 80. An example identifier may be the inventorystartup.exe which is the first application started when an inventory control system is initiated.

A heuristic routine 330a-f is an algorithm that examines trace data 310 in relation to an identifier and determines whether a resource found in the trace data 310 should be associated with a logical application. This determination is very complex and difficult because the single identifier provides such little information about the logical application 319. Consequently, heuristics are applied to provide as accurate of a determination as possible.

As used herein, the term "heuristic" means "a technique designed to solve a problem that ignores whether the solution is probably correct, but which usually produces a good solution or solves a simpler problem that contains or intersects with the solution of the more complex problem." (See definition on the website www.wikipedia.org.).

In a preferred embodiment, an initial set of heuristic routines 330a-f is provided, and a user is permitted to add his/her own heuristic routines 330a-f. The heuristic routines 330a-f cooperate with the discovery module 326. Once a heuristic routine 330a-f identifies a resource associated with the logical application, the discovery module 326 discovers the resources and creates the association of the resource to the logical application.

One heuristic routine 330a identifies all resources that are used by child applications of the application identified by the identifier. Another heuristic routine 330b identifies all resources in the same directory as a resource identified by the identifier. Another heuristic routine 330c analyzes usage behavior of a directory and parent directories that store the resource identified by the identifier to identify whether the sub or parent directories and all their contents are associated with the logical application.

One heuristic routine 330d determines whether the resource identified by the identifier belongs to an installation package, and if so, all resources in the installation package are deemed to satisfy the heuristic routine 330d. Another heuristic routine 330e examines resources used in a time window centered on the start time for execution of a resource identified by the identifier. Resources used within the time window satisfy the heuristic routine 330e. Finally, one heuristic routine 330f may be satisfied by resources which meet user-defined rules. These rules may include or exclude certain resources based on site-specific procedures that exist at a computer facility.

In one embodiment, the evaluation module 324 cooperates with the discovery module 326 to discover resources according to two distinct methodologies. The first methodology is referred to as a build-up scheme. Under this methodology, the heuristic routines 330a-f are applied to augment the set of resources currently within a set defining the logical application. In this manner, the initial resource identified by the identifier, the seed, grows into a network of associated resources as the heuristic routines 330a-f are applied. Use of this scheme represents confidence that the heuristic routines will not miss relevant resources, but runs the risk that some resources may be missed. However, this scheme may exclude unnecessary resources.

The second methodology, referred to as the whittle-down scheme, is more conservative but may include resources that are not actually associated with the logical application. The whittle-down scheme begins with a logical application comprising a pre-defined superset representing all resources that are accessible to the computer system(s) implementing the logical application, business process. The heuristic routines 330a-f are then applied using an inverse operation, meaning resources that satisfy a heuristic routine 330a-f are removed from the pre-defined superset.

Regardless of the methodology used, the evaluation module 324 produces a set of candidate resources which are communicated to the modification module 328. The modification module 328 communicates the candidate resources to the determination module 220 which adds or removes the candidate resources from the set defined in the logical application 319. The determination module 220 defines and re-defines the logical application 319 as indicated by the modification module 328.

Preferably, the evaluation module 324 is configured to apply the heuristic routines 330a-f for each resource presently included in the logical application 319. Consequently, the modification module 328 may also determine whether to re-run the evaluation module 324 against the logical application 319. In one embodiment, the modification module 328 may make such a determination based on a user-configurable percentage of change in the logical application 319 between running iterations of the evaluation module 324. Alternatively, a user-configurable setting may determine a predefined number of iterations.

In this manner, the logical application 319 continues to grow or shrink based on relationships between recently added resources and resources already present in the logical application 319. Once the logical application 319 changes very little between iterations, the logical application may be said to be stable.

Once the modification module 328 determines that the logical application 319 is complete (stable or the required number of iterations have been completed), the determination module 220 provides the logical application 319 to the interface 308. Preferably, the interface 308 allows a user to interact with the logical application 319 using either a Graphical User Interface 332 (GUI) or an Application Programming Interface 334 (API).

Figure 4:
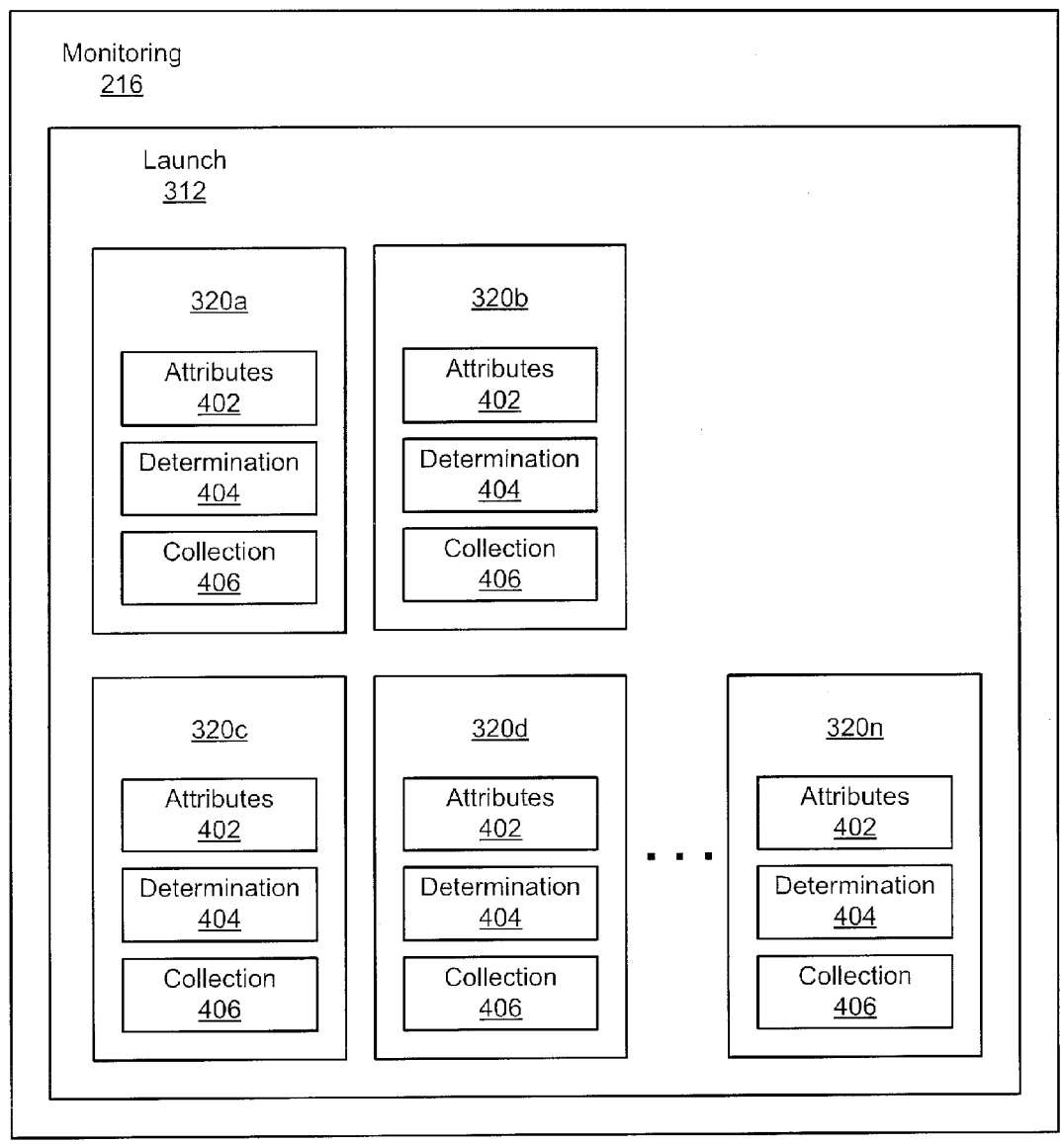
FIG. 4 is a schematic block diagram illustrating in more detail one embodiment of an apparatus for gathering trace data indicative of resource activity on a computer system.

FIG. 4 illustrates one embodiment of the monitoring module 216 of FIG. 3 in more detail. The monitoring module 216 preferably manages and controls monitoring of all resource activity on a target computer system. The monitoring module 216 may operate independently on the target computer system.

The monitoring module 216 may include a launch module 312 configured to initiate one or more activity monitors 320a-n. Alternatively, the monitoring module 216 and/or controller 314 (See FIG. 3) may initiate the one or more activity monitors 320a-n. The monitoring module 216 through the launch module 312 may start or stop certain activity monitors 320a-n according to various criteria.

In one embodiment, the launch module 312 starts the activity monitors 320a-n according to a user-configurable schedule. Certain activity monitors 320a-n may operate continuously until a stop command is issued. Preferably, activity monitors 320a-n execute until a specific type of monitoring task is completed. Once the monitoring task is completed, an activity monitor 320 may terminate or enter a suspended ("Sleep") mode until an internal timer causes the activity monitor 320 to resume its monitoring task.

The launch module 312 may start other activity monitors 320a-n according to user-defined time criteria maintained either by the launch module 312 or by the activity monitors 320a-n individually. The user-defined time criteria may be configurable. The launch module 312 may start certain activity monitors 320a-n in response to a predefined event occurring on the target computer system. A predefined event may include the starting or stopping of a certain process, mounting of a peripheral device, an error condition, or the like.

Each activity monitor 320a-n may detect a specific type of resource activity. Alternatively, one or more activity monitors detect a plurality of types of resource activities. The types of resource activities may cover a wide range and is open to new types of resource activities as computing operations on a target system change over time. Examples of types of resource activities include executing processes, file I/O activity, network I/O activity, and peripheral I/O activity.

Preferably, each activity monitor 320a-n is a separate module independent of the other activity monitors 320a-n. The activity monitors 320a-n are configured according to a modular design such that certain activity monitors 320 may be added, modified, or replaced without affecting operation of the other activity monitors 320a-n. In this manner, the monitoring module 216 may change and adapt to different monitoring requirements for a target computer system. In addition, the monitoring module 216 can readily be changed to monitor new types of resource activity as technology changes and adapts.

Preferably, the activity monitors 320a-n are implemented as software objects using an object oriented programming language such as JAVA, C++, or the like. These software objects may include inherited data and methods that allow the activity monitor 320a-n to be readily adapted to a specific type of resource activity. In addition, the software objects may include a common interface to the launch module 312 and monitoring module 216 to facilitate management of the activity monitor 320a-n.

Each activity monitor 320a-n comprises a set of attributes 402. The attributes 402 define characteristics about the activity monitor 320a-n. Those of skill in the art will recognize a variety of attributes 402 that may be included. Certain attributes 402 may include a name for the activity monitor 320a-n, a label or description of the type of resource activity that is detected, a start time schedule, a stop time interval, an output location for trace data, and the like. Certain attributes 402 may be user-configurable.

In keeping with the modular design, in one embodiment, each activity monitor includes sufficient functionality to determine and collect activity indicators. Specifically, each activity monitor 320a-n may include a determination module 404 and a collection module 406. The determination module 404 determines activity indicators generated or caused by resources of the target computer system. Preferably, each determination module 404 determines a specific type of activity indicators. The type of activity indicators correspond to the type of resource activity the activity monitor 320a-n is configured to detect.

The collection module 406 organizes the activity indicators determined by the determination module 404 into trace data 310 (See FIG. 3). The trace data 310 is representative of resource activity. In addition, the collection module 406 may add metadata to the trace data 310. The metadata may include such information as a timestamp for when a record of the trace data was generated, what version of an activity monitor 320a-n was used, what type of data the record represents, and the like. Preferably, the collection module 406 organizes sets of activity indicators into records. Fields of the records may vary based on the type of resource activity monitored.

In one example, suppose activity monitor 320a is configured to detect and determine resource activities related to executing processes on the target computer system. Consequently, the determination module 404 may periodically determine which processes are executing, which resources are the source of the processes, what relationships exist between executing processes, as well as all statistics available about the executing processes and the resources (executable files) used to generate the processes. This information comprises a few examples of activity indicators.

Next, the collection module 406 may organize the activity indicators into trace data records having a field for each activity indicator. In one embodiment, the collection module 406 may compute some fields of the trace data record. In the above example, an execution time value may be computed based on a start time and an end time for a process. In addition, the collection module 406 may include a timestamp in the trace data record indicating when the activity indicators were gathered and recorded.

The collection modules 406 may independently communicate with the storage module 316 (See FIG. 3) to store one or more generated trace data records. Alternatively, the collection modules 406 may simply append trace data records to a single trace data file or separate trace data files that are specific to a particular type of activity monitor 320a-n. In one embodiment, the trace data records are stored in a data structure well known in the art. Preferably, the data structure corresponds to a standard data exchange format. For example, the trace data may be stored in an XML file or other standard well known file format. In this manner, the trace data may be accessed and read easily by a variety of conventional software applications.

Preferably, all trace data collected is stored for future use. No trace data is deleted or overwritten. As mentioned above, the trace data includes activity indicators. As activity monitors 320a-n continue to collect and record trace data, activity indicators that were current activity indicators age to become historical activity indicators. Preferably, the activity monitors 320a-n continuously collect and record trace data. Consequently, an unbroken historical record of trace data can be generated. The unbroken historical record may provide information that may otherwise be lost. For example, analysis of the unbroken historical record may be done to determine the frequency of execution of a specific process and its corresponding resource. Those of skill in the art will recognize other information that may be learned from an unbroken historical record of resource activity.

Figure 5:
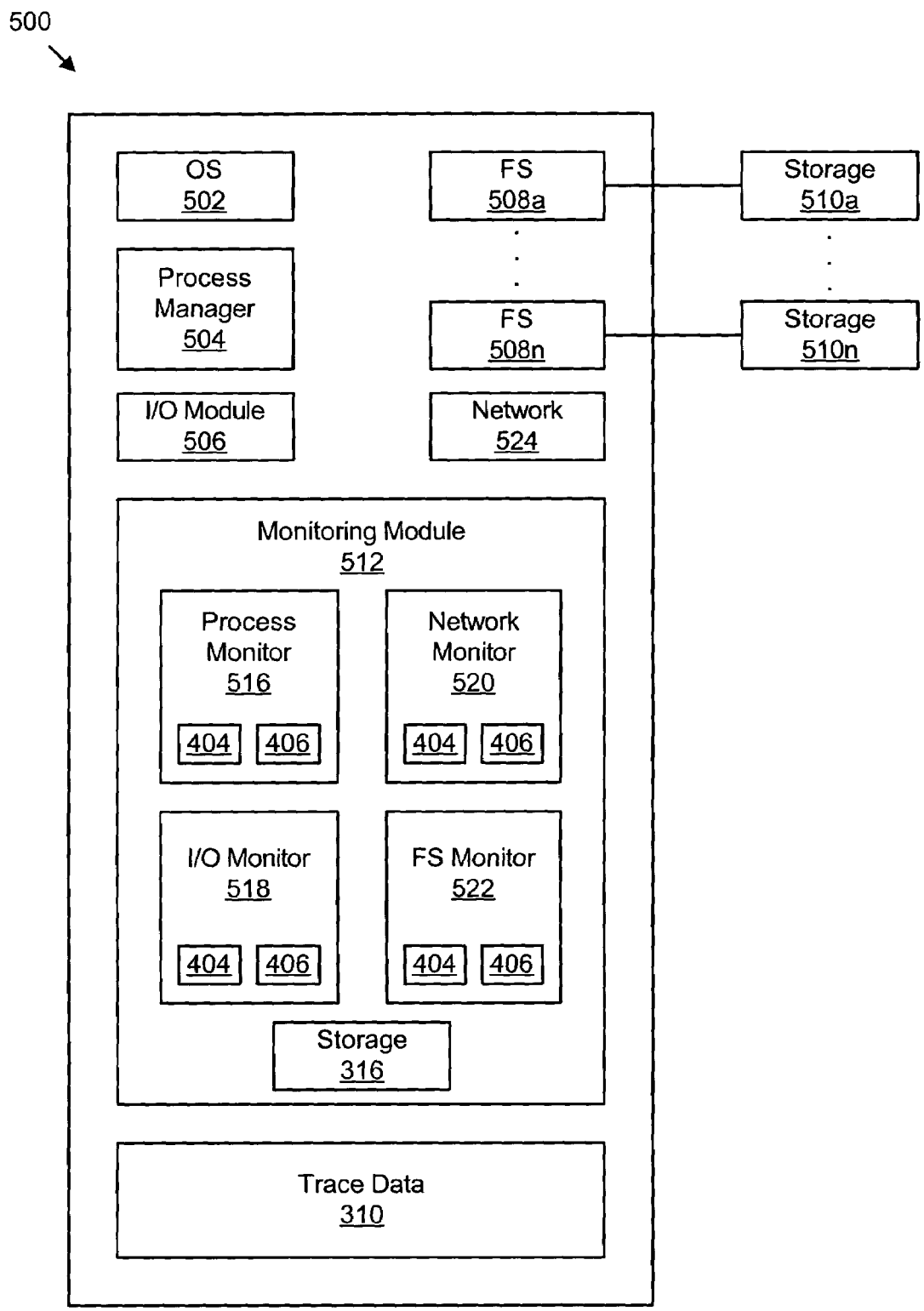
FIG. 5 is a schematic block diagram illustrating a system in accordance with the present invention.

FIG. 5 illustrates one embodiment of a system 500 for gathering trace data 310 indicative of resource activity. The system 500 includes an operating system 502, process manager 504, and I/O module 506. The operating system 502 manages execution of processes. The process manager 504 provides information on running processes. The I/O module 506 provides information on file activity.

The system 500 may include a plurality of file systems (FS) 508a-n that use corresponding storage devices 510a-n. The I/O module 506 may provide file information for all the file systems 508a-n. Preferably, the I/O module 506 and process manager 504 provide information regarding resource activity in both a real-time and point-in-time manner. Those of skill in the art will recognize that various other modules may be included in the system 500 which may provide relevant resource activity information. For example, storage subsystem modules, memory modules, multimedia modules, and the like may also provide resource activity information.

A monitoring module 512 collects trace data 310 during execution of processes by the operating system 502. The monitoring module 512 operates in substantially the same manner as the monitoring module 216 illustrated in FIG. 3. Preferably, the monitoring module 512 is installed on the target system 500.

The monitoring module 512 may interact with the process manager 504, I/O module 506, and file systems 508a-n to collect trace data 310. As described in relation to FIG. 4, the monitoring module 512 collects certain types of trace data 310 using activity monitors 320a-n. Representative examples of a few activity monitors 320a-n may include a process monitor 516, I/O monitor 518, network monitor 520, and FS monitor 522.

By way of example, each type of monitor 516, 518, 520, 522 illustrated will be described. Each of the monitors 516, 518, 520, 522 may include a determination module 404 and collection module 406 configured to function in similar manner to the corresponding modules 404, 406 described in relation to FIG. 4. The main difference is that each monitor 516, 518, 520, 522 is configured to gather activity indicators for a particular type of resource activity. Those of skill in the art will appreciate that the system 500 may include more monitors or fewer monitors than those illustrated. In addition, the modular design of the monitors 516, 518, 520, 522 allows the set of monitors to be readily changed as needed.

The process monitor 516 interacts with the process manager 504 to gather resource activity relating to executing processes on the system 500. This type of resource activity includes which resources are executing, which resources have been spawned by other resources and how the resources are related. Preferably, this type of resource activity comprises all operations related to execution of a process on the target computer system 500.

Preferably, the process monitor 516, as with all the monitors 516, 518, 520, 522, gathers all the activity indicators available from the hardware and software components of the target computer system, the system 500. The activity monitor makes every effort to collect as many activity indicators as possible that relate to the particular type of resource activity. Consequently, the process monitor 516 may interact with other software and hardware components such as the FS 508a-n to gather resource activity indicators beyond those available from the process manager 504.

For example, activity indicators from the process manager 504 may indicate that Process A executing from object code in File X began executing at 12:00 am and is still running. These pieces of information, "process A began executing from 12:00 am on and comes from object code in File X," are representative examples of resource activity indicators. The resource may be File X. The determination module 404 determines what information from the process manager 504 is an activity indicator. The collection module 406 takes the activity indicators and organizes them into fields for storage as trace data 310.

However, the process manager 504 may not indicate where File X is stored. Consequently, the process monitor 516 may communicate with one or more FS 508a-n to find the path to where the file, resource, is stored. Whether or not a file path is gathered by the process monitor 516 depends on how the process monitor 516 is configured. In certain embodiments, a user may activate and deactivate gathering of particular activity indicators by an activity monitor 320a-n (See FIG. 3), such as the process monitor 516.

The I/O monitor 518 interacts with the I/O module 506 to gather resource activity relating to all file I/O on the target system 500. This type of resource activity may include operations such as file open, file close, file read, file modification, file delete, file create, and the like. The file I/O activities are performed by executable files of the target system 500. Typically, the activity indicators may include information such as the name of the process conducting the file I/O operation, the target file involved in the operation, the timestamp, file size information, the owner of the respective files, and the like. In this manner, trace data 310 collected by the I/O monitor 518 may be used to determine how files of the target computer system are being used.

The network monitor 520 interacts with a network access point such as a network access card 524 or network subsystem (Not Shown). The network monitor 520 gathers resource activity relating to network messages sent to/from resources of the system 500. This type of resource activity may include messages for network resources such as web pages, URLs, web services, and the like. The activity indicators of this type may include the name of the process, a timestamp, the type of message sent, the port used, the socket used, the destination address for the message, etc. In this manner, trace data 310 collected by the network monitor 520 may be used to identify network resources, including third party applications and data that is being used by resources of the target computer system 500. The resources may comprise files or ports used by certain files to communicate over the network.

The File System (FS) monitor 522 interacts with the FSs 508a-n to gather resource activity relating to files of the target computer system 500. This type of resource activity typically includes all resource activity that may be gathered by scanning information in the FSs 508a-n. Typically, resources comprise files and the files are stored in the FSs 508a-n. The activity indicators of this type may include directory names, directory structure, directory creation, modification, and access times, directory ownership, directory access permissions, and the like. Similarly, other activity indicators may include file names, file format, file creation, modification, and access times, file ownership, file access permissions, indirect file links, and the like. In this manner, trace data 310 collected by the FS monitor 522 may be used to identify what file resources are available to the target computer system 500 and how those file resources are related and manipulated over time.

The monitors 516, 518, 520, 522 may communicate with a storage module 316 to store collected trace data 310. Alternatively, each monitor 516, 518, 520, 522 may include functionality to store the trace data 310.

Preferably, the monitoring module 512 initiates the monitors 516, 518, 520, 522 based on the type of resource activity that is being monitored. For example, the process monitor 516 and FS monitor 522 may be executed periodically in order to minimize the impact of the monitors 516, 518, 520, 522 on the performance of the target computer system 500. The process monitor 516 and FS monitor 522 may perform the monitoring task and then terminate or hibernate (sleep) for a time interval. The time interval may be defined in the attributes 402 (See FIG. 4). In certain implementations, the network monitor 520 may be periodically initiated to scan network traffic and assigned network ports before hibernating.

Consequently, certain monitors 516, 518, 520, 522 may be known as "crawlers" because they periodically resume operation for a period of time and then hibernate once the task is completed or a time interval expires. Such monitors 516, 518, 520, 522 take "snap shots" of the current activity indicators which are indicative of resource activities. Other activity monitors such as the I/O monitor 518 may execute continuously.

Figure 6:
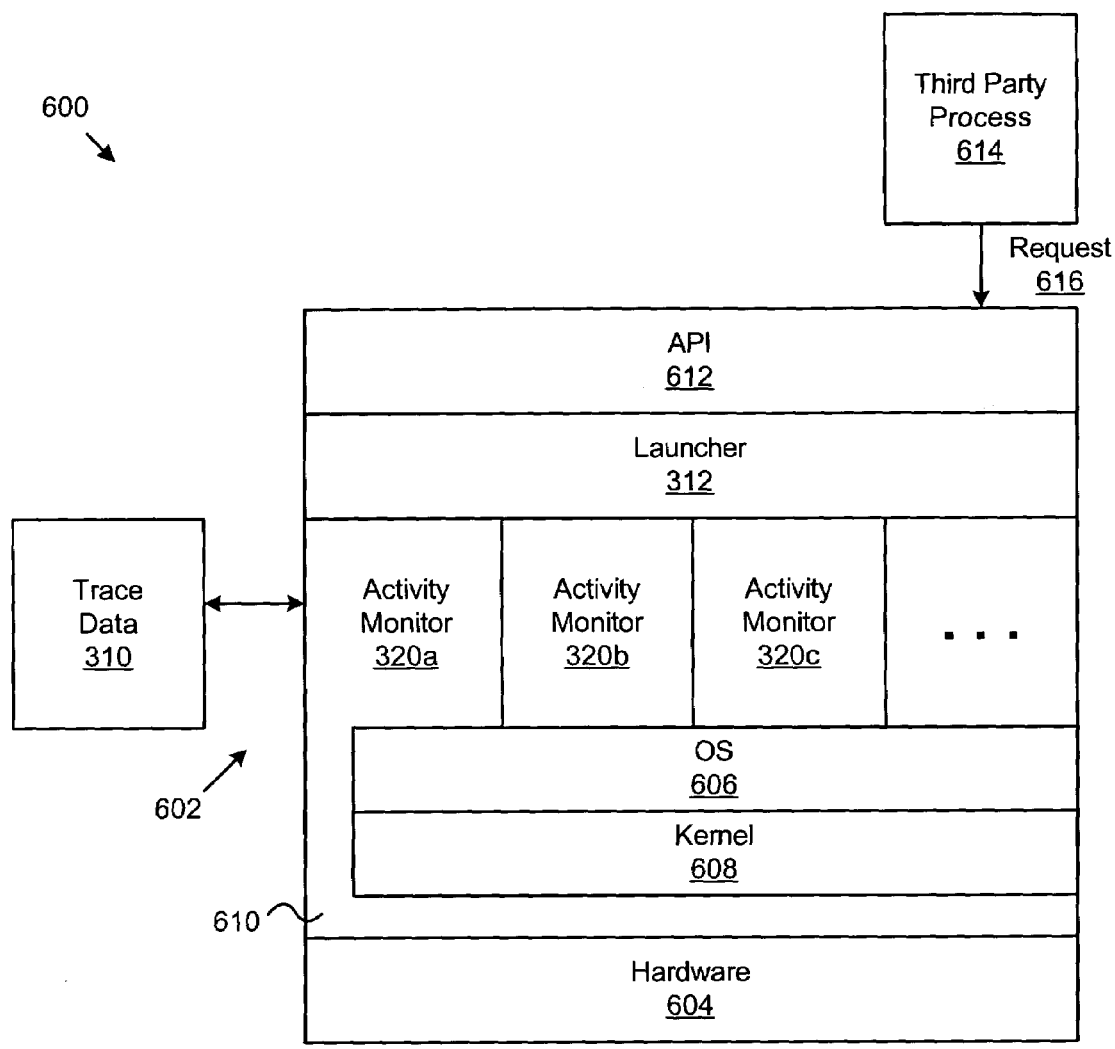
FIG. 6 is a schematic block diagram illustrating a software architecture in accordance with one embodiment of the present invention.

FIG. 6 illustrates a software architecture 600 in accordance with one embodiment of the present invention. The software architecture 600 includes a software stack 602 that illustrates a hierarchical relationship between modules of one embodiment of the present invention and hardware 604 of the target computer system. The hardware 604 comprises well known computer components such as a processor, main memory, user I/O controllers, peripheral controllers, and the like. In addition, the hardware 604 includes peripheral components such as a network interface, storage devices, removable media devices, printers, computer readable storage medium, and the like.

Typically, the hardware 604 is managed and controlled by an operating system 606. The operating system 606 manages access to the hardware resources by software resources such as processes and files. Often this means that no processes on the target computer system are permitted to interface directly with the hardware. Instead, all communication with the hardware must pass through the operating system 606.

The operating system 606 may include tools such as a process manager 504 (See FIG. 5), an I/O module 506, network module 524, and FSs 508a-n. Typically, the heart of an operating system 606 is the kernel 608. The kernel 608 typically handles all communications between processes (including operating system tools and device drivers) and the hardware 604.

However, the kernel 608 may include a "hook," low-level interface, that allows a special driver to also receive all communications between processes and the hardware 604. Typically, this low-level interface has strict protocols and controls to ensure that these special drivers are unable to compromise the integrity and security of the target computer system. In certain operating systems, these special drivers are referred to as "Filter Drivers." The low-level interface may require the special drivers to specify a certain hardware device or class of hardware devices for which all messages sent to or received from processes of the target computer system are also passed to the driver. The driver may then allow the messages to continue to the destination or filter them out for some reason.

The next level of the software stack 602 illustrates a plurality of activity monitors 320*a-n* (See FIG. 3) that are provided, in some embodiments, with higher priority access to the hardware 604. In particular, in order to accurately determine all file activity, one activity monitor 320*a* such as an I/O monitor 518 (See FIG. 5) includes a filter driver 610. The filter driver 610 is illustrated between the kernel 608 and the hardware 604, and extends up into the activity monitor 320*a*. The filter driver 610 may execute continuously. Alternatively, the filter driver 610 may reside in memory and execute in response to certain system events such as a file I/O message received by the kernel 608.

The filter driver 610 allows the I/O monitor 518 to determine activity indicators for all messages to and from a class of peripheral devices such as storage devices. Of course, other activity monitors and other filter drivers may monitor other classes of devices. In this manner, the filter driver 610 can determine all file I/O activity between processes on the target computer system and the storage devices.

The next level of the software stack 602 illustrates a launcher 312 that operates in substantially the same manner as described in relation to FIG. 4. The software stack 602 may also include an Application Programming Interface (API) 612. The API 612 defines a set of functions that other third-party processes 614 can utilize. The API 612 accesses the trace data 310 (See FIG. 3) and provides at least a portion of the trace data to the third-party process 614 in response to a request 616.

Preferably, the API 612 includes basic filtering and query capabilities such that generic queries from the third-party process 614 can be satisfied. For example, suppose the third-party process 614 is a backup software product scheduled to daily backup changed files on the storage devices of the target computer system. Ordinarily, the backup software product would conduct a scan of all the files on all the storage devices for files and directories modified in the last twenty-four hours. This operation may take several minutes.

However, the API 612 is configured to allow the backup software product to include a basic query in the request 616 such as "Find all files modified in last 24 hours." The API 612 includes well known software modules that apply the query to the trace data 310. Because the activity monitors 320*a-n* are constantly updating the trace data 310, a scan of the storage devices is not necessary. Instead, the trace data 310 filtered based on the query criteria and the result set is passed to the backup software product 614.

In this manner, the API 612 maybe considered a service or daemon process for the target computer system. Of course, the API 612 may include a variety of well known functions that utilize the trace data 310 for the third-party processes 614. The API 612 allows the third-party processes 614 to be more efficient and leverage the collection and monitoring work previously performed by the activity monitors 320*a-n*.

In addition, the third-party processes 614 need not include scanning or probing functionality to discover data that is readily available in the trace data 310 through the API 612. Consequently, the third-party processes 614 can be developed using less software code and development time but provide similar functionality more efficiently. Furthermore, in certain embodiments, the third-party processes 614 may search the trace data 310 to find information of interest concerning resource activity. Such independent searching is facilitated by the present invention organizing the trace data 310 according to a standard data exchange format such as XML.

Figure 7:
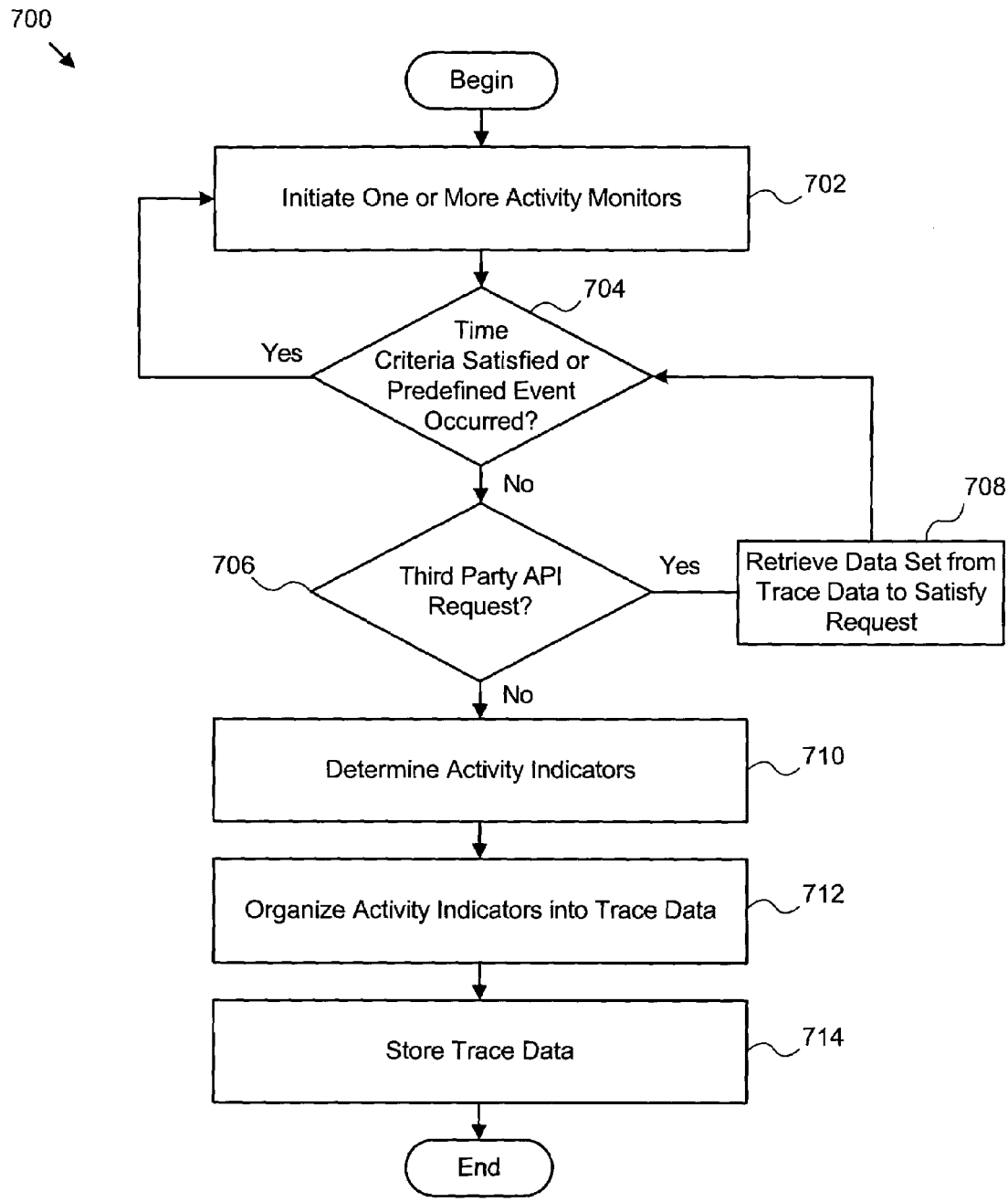
FIG. 7 is a schematic flow chart diagram illustrating a method for gathering trace data indicative of resource activity on a computer system.

FIG. 7 illustrates a flow chart of a method 700 for gathering trace data 310 (See FIG. 3) indicative of resource activity on a computer system. The method 700 begins by initiating 702 one or more activity monitors 320*a-n*. Preferably, each activity monitor 320*a-n* detects a specific type of resource activity on the target computer system. The activity monitors 320*a-n* may be modular such that each operates independently of the others.

Certain activity monitor 320*a-n* may operate continuously while others may scan information about the target computer system (such as a process manager 504) to collect trace data 310 and then terminate or suspend operation until certain time criteria are satisfied. Other activity monitors 320*a-n* may be so closely coupled to the target computer system that the occurrence of certain events causes the activity monitor 320 to be activated to record activity indicators related to the event as trace data 310. Still other activity monitors 320*a-n* may operate for a predetermined time period.

Next, a determination 704 is made whether time criteria are satisfied or a predefined event has occurred. If so, the method 700 initiates or re-initiates another activity monitor 320*a-n*. In one embodiment, the time criteria and/or events are defined using a configurable schedule. The schedule and/or events may be defined in a user-configurable attribute for at least one activity monitor 320*a-n*.

In one embodiment, if the determination 704 is made that no additional activity monitors 320*a-n* need to be initiated at this time, a second determination 706 may be made. A monitoring module 512 (See FIG. 5) may determine 706 whether any third-party requests 616 (See FIG. 6) for trace data 310 have been received. If so, at least a portion of the trace data 310 is retrieved 708 to form a dataset that is sent to satisfy the request 616. Preferably, each request 616 conforms to an API published for the monitoring module 512. Once the request 616 is satisfied, the method 700 may return to determination step 704.

If no third party requests 616 have been received 706, each activity monitor 320*a-n* independently determines 710 activity indicators relevant to the type of resource activity the activity monitor 320*a-n* is configured to detect and monitor. As discussed above, the activity indicators are any information/characteristics about the target computer and its resources indicative of a particular resource activity (file I/O, network I/O, etc.) Examples of activity indicators include currently executing processes, open files, closed files, active network sockets, and the like.

Next, activity indicators are organized 712 into trace data 310. Preferably, each activity monitor 320 organizes activity indicators independently. Organization of activity indicators may include formatting and data type conversion or encoding as well as determination of metadata related to the activity indicators. The metadata may comprise information such as time stamps, device identifiers, activity monitoring intervals, and the like. Preferably, the trace data 310 is organized into a standard data exchange format such as XML. Finally, the trace data 310 is stored 714 for subsequent use and analysis and the method 700 ends. Preferably, the trace data 310 is stored in a central repository.

In one embodiment, the activity monitors 320 are initiated and managed automatically over an extended continuous period of time (several days). Consequently, the trace data 310 includes current activity indicators and historical activity indicators. Having both current activity indicators and historical activity indicators allows for subsequent data mining to be performed on the trace data 310. The data mining may provide additional information beyond the raw data within the trace data 310.

For example, certain activity indicators may be correlated with others over time to provide efficiency information about a particular resource used on the target computer system. As another example, the trace data 310 may be analyzed to identify all the resources (i.e., executable files, data files, etc.) employed to implement a business process such as inventory control. These identified resources may be from disparate software packages and cooperate to perform the desired business process. With the resources identified, business level policies may be readily implemented for the business process as a whole.

In summary, the present invention provides an apparatus, system, and method for gathering trace data indicative of resource activity on a target computer system. The present invention provides activity indicators that may be used by a variety of processes through the API. The trace data collected is comprehensive such that activity indicators discovered to have high significance in the future are available even if the target computer system or its configuration becomes unavailable. In addition, the trace data is collected automatically and continuously such that both current activity indicators and historical activity indicators are available. Resources that conducted the activities are also identified. The trace data is provided in a standard data exchange format such that third party processes can access the trace data directly or through the API. In this manner, less software coding is required for third party processes. The present invention allows the trace data to be gathered in a modular manner such that different types of trace data may be gathered without altering the present invention except to plug-in a different activity monitor. Consequently, the present invention may be modified to accommodate upgrades and changes to gather different types of trace data over time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to gather trace data indicative of resource activity of a logical application and to identify resources related to a business process, the method comprising:

initiating a plurality of activity monitors of a monitoring module on a target computer system executing said logical application, the target computer system comprising one or more processors, each activity monitor configured to detect a specific type of resource activity and configured to detect a different type of resource activity independent of other activity monitors, the monitoring module interacting with a process manager, a file I/O module, and a network I/O module to collect said trace data representative of said resource activity wherein at least one activity monitor comprises a low-level I/O module that receives all I/O communication for a class of peripheral devices of the target computer system;

determining activity indicators involving the resources of the logical application by way of said each activity monitor, the activity indicators identifying one or more resource activities and comprising process spawning operations, file I/O operations, and network I/O operations wherein said logical application is a collection of said resources required to implement a particular business process;

organizing the activity indicators from said each activity monitor into said trace data, the trace data organized according to a standard data exchange format and comprising current activity indicators and historical activity indicators comprising a continuous historical record of activity indicators stored at a plurality of different points in time, the trace data comprising an identifier configured to associate the trace data with said business process, the business process comprising operation of a plurality of hardware and software components in cooperation to execute a service;

storing the trace data in a central repository implemented on computer readable storage;

filtering the trace data by the identifier to identify said resources related to the business process, each resource comprising a confidence value configured to indicate how likely the resource is associated with the business process; and communicating the trace data to a third-party computer process in response to a request from the third-party computer process, the request conforming to an application program interface (API).

2. The method of claim 1 wherein said initiating the plurality of activity monitors further comprises initiating selected activity monitors in response to user-defined time criteria and other select activity monitors in response to occurrence of a predefined event on the target computer system.

3. The method of claim 1, wherein said determining activity indicators further comprises determining said activity indicators available from hardware and software components of the target computer system.

4. A computer program product comprising a computer readable storage medium storing computer usable program code executable to perform operations to gather trace data indicative of resource activity of a logical application and to identify resources related to a business process, the computer program product comprising:

initiating a plurality of activity monitors of a monitoring module on a target computer system executing said logical application, each activity monitor configured to detect a specific type of resource activity, and configured to detect a different type of resource activity independent of other activity monitors, the monitoring module interacting with a process manager, a file I/O module, and a network I/O module to collect said trace data representative of various types of said resource activities wherein at least one activity monitor comprises a low-level I/O module that receives all I/O communication for a class of peripheral devices of the target computer system;

determining activity indicators involving the resources of the logical application by way of said each activity monitor, the activity indicators identifying one or more resource activities and comprising process spawning operations, file I/O operations, and network I/O operations wherein the logical application is a collection of resources required to implement a particular business process;

organizing the activity indicators from said each activity monitor into said trace data determined by the plurality of activity monitors, the trace data organized according to a standard data exchange format and including current activity indicators and historical activity indicators comprising a continuous historical record of activity indicators stored at a plurality of different points in time, the trace data comprising an identifier configured to associate the trace data with said business process, the business process comprising operation of a plurality of hardware and software components in cooperation to execute a service;

storing the trace data in a central repository;

filtering the trace data by the identifier to identify said resources related to the business process, each resource comprising a confidence value configured to indicate how likely the resource is associated with the business process; and communicating the trace data to a third-party computer process in response to a request from the third-party computer process, the request conforming to an application program interface (API).

5. The computer program product of claim 4, wherein said initiating the plurality of activity monitors further comprises initiating the at least one activity monitor according to a schedule determined by a user-configurable attribute for the at least one activity monitor, the at least one activity monitor ceasing operation in response to completing determination of said specific type of resource activity.

6. The computer program product of claim 4 wherein said initiating the plurality of activity monitors further comprises initiating the at least one activity monitor that continuously executes on the target computer system hosting the logical application and determines the activity indicators in response to select system events.

7. The computer program product of claim 4 wherein the plurality of activity monitors are modular such that select activity monitors are replaced or modified and new activity monitors are added without affecting said other activity monitors within the plurality of activity monitors.

8. The computer program product of claim 4, wherein the activity indicators comprise resource attribute indicative of activities involving a particular resource.

9. An apparatus to gather trace data indicative of resource activity of a logical application and to identify resources related to a business process, the apparatus comprising:

a processor coupled to a memory, the memory comprising a monitoring module configured to initiate a plurality of activity monitors on a target computer system executing said logical application, the activity monitor configured to detect a specific type of resource activity and configured to detect a different type of resource activity independent of other activity monitors, the monitoring module interacting with a process manager, a file I/O module, and a network I/O module to collect said trace data representative of said resource activity wherein at least one activity monitor comprises a low-level I/O module that receives all I/O communication for a class of peripheral devices of the target computer system;

a determination module closely coupled to the target computer system and configured to determine activity indicators involving the resources of the logical application by way of said each activity monitor, the activity indicators identifying one or more said resource activities and comprising process spawning operations, file I/O operations, and network I/O operations wherein said logical application is a collection of resources required to implement a particular business process;

a collection module configured to organize the activity indicators from said each activity monitor into said trace data, the trace data comprising current activity indicators and historical activity indicators comprising a continuous historical record of activity indicators stored at a plurality of different points in time, the trace data comprising an identifier configured to associate the trace data with said business process, the business process comprising operation of a plurality of hardware and software components in cooperation to execute a service;

a storage module configured to store the trace data in a central repository;

an analysis module configured to filter the trace data by the identifier to identify said resources related to the business process, each resource comprising a confidence value configured to indicate how likely the resource is associated with the business process; and an application program interface (API) configured to communicate at least a portion of the trace data to a third-party computer process in response to a request.

10. The apparatus of claim 9, further comprising a launch module configured to initiate selected activity monitors in response to user-defined time criteria and further in response to occurrence of a predefined event on the target computer system.

11. The apparatus of claim 9, wherein the determination module is configured to determine said activity indicators available from hardware and software components of the target computer system.

12. A system to gather trace data indicative of resource activity of a logical application and to identify resources related to a business process, comprising:

an operating system configured to manage execution of processes;

a process manager configured to provide information on running processes;

an Input/Output (I/O) module configured to provide file activity information;

a file system configured to manage files stored in one or more storage devices and provide metadata about the files;

a processor coupled to a memory, the memory comprising a monitoring module configured to initiate a plurality of activity monitors on a target computer system executing said logical application, the activity monitor configured to detect a specific type of resource activity and configured to detect a different type of resource activity independent of other activity monitors, the monitoring module interacting with a process manager, a file I/O module, and a network I/O module to collect said trace data representative of said resource activity wherein at least one activity monitor comprises a low-level I/O module that receives all I/O communication for a class of peripheral devices of the target computer system;

a determination module closely coupled to the target computer system and configured to determine activity indicators involving the resources of the logical application by way of said each activity monitor, the activity indicators identifying one or more said resource activities and comprising process spawning operations, file I/O operations, and network I/O operations wherein said logical application is a collection of resources required to implement a particular business process;

a collection module configured to organize the activity indicators from said each activity monitor into said trace data, the trace data comprising current activity indicators and historical activity indicators comprising a continuous historical record of activity indicators stored at a plurality of different points in time, the trace data comprising an identifier configured to associate the trace data with said business process, the business process comprising operation of a plurality of hardware and software components in cooperation to execute a service a storage module configured to store the trace data in a central repository;

an analysis module configured to filter the trace data by the identifier to identify said resources related to the business process, each resource comprising a confidence value configured to indicate how likely the resource is associated with the business process; and an application program interface (API) configured to communicate at least a portion of the trace data to a third-party computer process in response to a request.

13. The system of claim 12 wherein said at least one activity monitor is initiated according to a schedule determined by a user-configurable attribute for the at least one activity monitor, the at least one activity monitor ceasing operation in response to completing determination of said specific type of resource activity.

14. The system of claim 12 wherein the monitoring module is further configured to initiate the at least one activity monitor that continuously executes on the target computer system and determines the activity indicators in response to select system events.

15. The system of claim 12, wherein the plurality of activity monitors are modular such that select activity monitors are replaceable and modifiable and new activity monitors are added without affecting said other activity monitors within the plurality of activity monitors.

* * * * *

UNITED STATES PATENT AND TRADEMARK OFFICE
CERTIFICATE OF CORRECTION

PATENT NO. : 7,661,135 B2
APPLICATION NO. : 10/915004
DATED : February 9, 2010
INVENTOR(S) : Byrd et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 965 days.

Signed and Sealed this

Thirtieth Day of November, 2010

David J. Kappos
*Director of the United States Patent and Trademark Office*